Oct. 1, 1963  G. CAPPA  3,105,536
MULTIPLE TIRE FOR RUNNING ON LOOSE GROUND
Filed May 19, 1961  3 Sheets-Sheet 1

INVENTOR
Giulio Cappa

BY *Stevens, Davis, Miller & Mosher*
ATTORNEYS

Oct. 1, 1963  G. CAPPA  3,105,536
MULTIPLE TIRE FOR RUNNING ON LOOSE GROUND
Filed May 19, 1961  3 Sheets-Sheet 2

INVENTOR
Giulio Cappa

BY Stevens, Davis, Miller & Mosher
ATTORNEYS

Oct. 1, 1963   G. CAPPA   3,105,536
MULTIPLE TIRE FOR RUNNING ON LOOSE GROUND
Filed May 19, 1961   3 Sheets-Sheet 3

INVENTOR
Giulio Cappa

BY
Stevens, Davis, Miller & Mosher
ATTORNEYS

United States Patent Office 3,105,536
Patented Oct. 1, 1963

3,105,536
MULTIPLE TIRE FOR RUNNING ON LOOSE GROUND
Giulio Cappa, Milan, Italy, assignor to Pirelli S.p.A., Milan, Italy
Filed May 19, 1961, Ser. No. 111,326
Claims priority, application Italy June 22, 1960
8 Claims. (Cl. 152—188)

The present invention relates to a multiple tire for vehicle wheels designed for travel over sand or on loose or incoherent ground.

In connection with tires which are designed to run on loose or incoherent ground, there are two basic problems which must be considered; namely, (1) to improve the traction of the driving wheels on the ground, and (2) to reduce the sinking of all wheels.

With regard to the first problem, when conventional tires are pressed against the ground during use, certain movements and contractions take place in the impression area of the tread; i.e. the portion which is in contact with the ground. These movements and contractions in the tread produce corresponding movements in the loose ground which obviously affects the traction of the tire.

With regard to the second problem (the proposition of reducing the sinking of the wheels), attempts to solve this problem have involved using tires of greater size and/or decreasing the inflation pressure of the tire. However, both of the latter proposals, which reduce the pressure per unit of area of contact of the tread against the ground, involve serious drawbacks and inconveniences. For example, the use of tires of greater size, apart from their inherently higher cost, may result in interference with the mechanical elements of the vehicle and also with the tires themselves, such as, when the rear axles of the vehicles are provided with twin tires. Thus, the use of normal vehicles, in certain cases, would be quite inapplicable. Furthermore, the reduction of the inflation pressure would involve a decrease in the capacity and/or in the speed of the vehicle, consequently involving a higher cost of transportation.

In accordance with the present invention, there is provided a tire comprising:

(a) A separate tread in the shape of a closed ring having a resistant structure which makes it inextensible in the longitudinal direction, namely, in the direction of its development; and (b) A group of two or more carcasses aligned longitudinal and/or transversely, the outer surface of each carcass being designed to engage with the tread or with a part thereof; all of the carcasses being connected to one another by means of the tread.

The tread, because of its inextensibility, behaves as a track and, therefore, avoids movements of the ground in the area of contact thereby providing the desired traction which the conventional tires fail to provide.

Furthermore, in view of the connection of a plurality of carcasses by means of the tread, the area of contact is increased considerably such that the average contact pressure is reduced correspondingly and the "floating" condition of the tire is improved.

The tread is provided with a resistant structure, or internal reinforcements, which may be one of several already known per se; however, it is necessary that this resistant structure should ensure a substantial inextensibility in the longitudinal direction. For example, the resistant structure may be constituted by one or more layers of low-elongation cords arranged parallel to one another in each layer and disposed in a prevailingly longitudinal direction. Furthermore, this resistant structure may be formed of one or more superposed layers wherein each layer is formed by winding a cord, preferably made of metal, in a continuous helix such that the coils of the helix are substantially longitudinally disposed. In the latter case, it may be desirable to include one or more layers of metal cords arranged transversely over the resistant structure.

The carcasses must be able to allow for small longitudinal movements of the tread; for this purpose, such carcasses may comprise radial carcasses in which the carcass plies are disposed substantially radially of the tire, such as the carcass described in Lugli Patent No. 2,874,742. Secondly, the carcass may be of the type wherein the cords of the plies are substantially radial in the sidewalls and crossed in the central zone of the tire below the tread, as shown in Lugli et al. Patent No. 2,930,425. Thirdly, the carcass may be one having a geodetical disposition in the area below the tread and a crossed structure in the sidewalls as disclosed in application Serial No. 799,955 filed on March 17, 1959, now Patent No. 3,062,258. Finally, the carcass may be devoid of carcass plies as described in application Serial No. 760,037 filed September 9, 1958, now abandoned.

When the carcass is radial or substantially radial, it is preferable to employ a breaker strip constituted by two or more layers of cords parallel to one another in each layer, the cords of all layers being disposed along crossed directions and being inclined with respect to the mid-circumferential plane of the tire at an angle ranging between 35° and 60°.

In accordance with one form of the present invention, the carcasses, preferably two, are aligned in such a way that their mid-circumferential planes are coincident. These carcasses are then provided with a tread as described above having such a length as to envelop each of tthe two carcasses for an arc of 180° or, if a greater number of carcasses is adopted, to envelop each of the two outer carcasses of the group for an arc of 180°; the tread will be placed under tension by the inflation pressure of the casings themselves.

In the last-mentioned embodiment, the transmission of the driving or braking forces is achieved through the frictional forces due to the inflation pressure which pushes the carcasses against the inner surface of the inextensible tread.

In accordance with another embodiment of the present invention, two (or more) carcasses constituting one group are disposed coaxially in side-by-side relation in a so-called "twin-assembly." These carcasses are then provided with a single tread having a width sufficient to engage with all of the carcasses. The longitudinal development of this tread is such that its inner surface engages the outer peripheries of the carcasses so as to be placed under tension when the carcasses are inflated.

In both of the embodiments described above, there are zones where the tread does not bear against any carcass and in which the contact pressure is therefore lower than that of the other zones. However, in the first embodiment described above, the tension in the tread, acting in a longitudinal direction, may be sufficient to produce an almost uniform distribution of contact pressure. On the other hand, in the "twin-assembly," the tension in the tread cannot produce a uniform distribution of contact pressure across the tread, there being a lower pressure in the zone between two carcasses. Nevertheless, this lower pressure in the zone between the two carcasses may prove to be advantageous since the loose ground is allowed to form a sort of projecting ridge disposed in this zone, thereby facilitating the grip of the tread on the ground.

If desired, the last-mentioned advantage of the "twin-assembly" can be increased by providing the resistant structure only in the tread portions which come in contact with the carcasses; in this construction, the portions of resistant structure are preferably constituted by one or more layers, each layer being formed of a single helically disposed cord. On the other hand, if it is desirable to render as uniform as possible the contact pressure across the entire tread, this result can be achieved by providing, in the zones of the tread which do not come in contact with the carcasses, certain reinforcements which will render the tread rigid under the action of torque contained in meridian planes, but which will render the tread flexible under the action of torque contained in planes normal to the axis of rotation.

For the purpose of providing greater transversal rigidity of the "twin-assembly," the resistant structure of the tread preferably extends for its entire width; also, one or more layers of transversal cords can be placed over the resistant structure so as to be disposed radially outwardly with respect thereto. If the last-mentioned arrangement is not sufficient, further reinforcements can be provided in addition to, or in substitution of, the layers of transversal cords; these additional reinforcements, for example, can be constituted by layers of metal cords, parallel to one another in each layer and inclined, with respect to the midcircumferential plane of the tire, at angles ranging between 70° and 90°; otherwise, these additional reinforcements can be constituted by transversal rods made of metal or of plastic material and distributed along the whole circumference of the tire assembly.

Therefore, it is a principal object of the present invention to provide a multiple tire assembly of the type described above which can be used on conventional vehicles and which will eliminate the above indicated drawbacks and inconveniences of conventional tires when travelling on loose or incoherent ground.

A further object of the present invention is to provide a tire comprising:

(a) A separate tread in the shape of a closed ring having a resistant structure which makes it inextensible in the longitudinal direction, namely, in the direction of its development; and (b) A group of two or more carcasses aligned longitudinal and/or transversally, the outer surface of each carcass being designed to engage with the tread or with a part thereof; all of the carcasses being connected to one another by means of the tread.

A further object of the present invention is to provide a tire of the type described above wherein, in the "twin-assembly," the tread portion is provided with additional reinforcements to increase the transverse rigidity of the tread.

Other and further objects and advantageous features of the present invention will hereinafter more fully appear in connection with a detailed description of the drawings in which.

Figure 1:
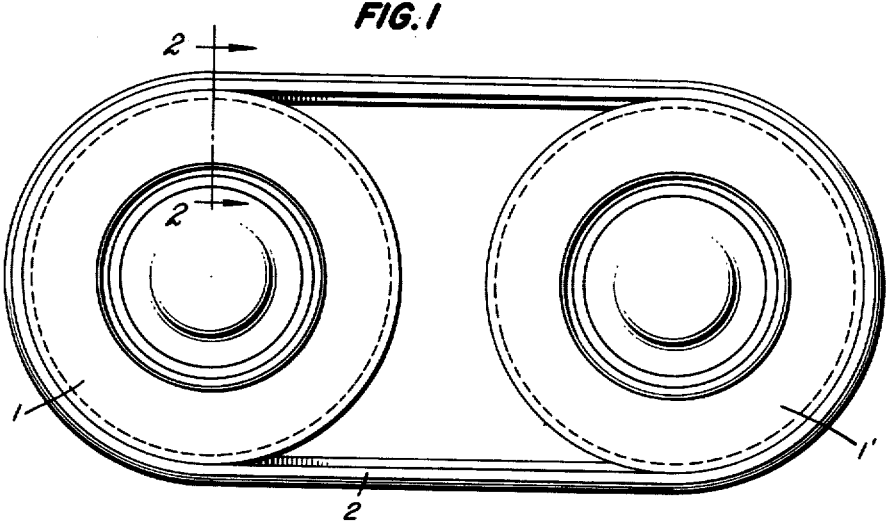
FIGURE 1 is a semi-diagrammatic side elevation of one embodiment of the present invention.
Figure 2:
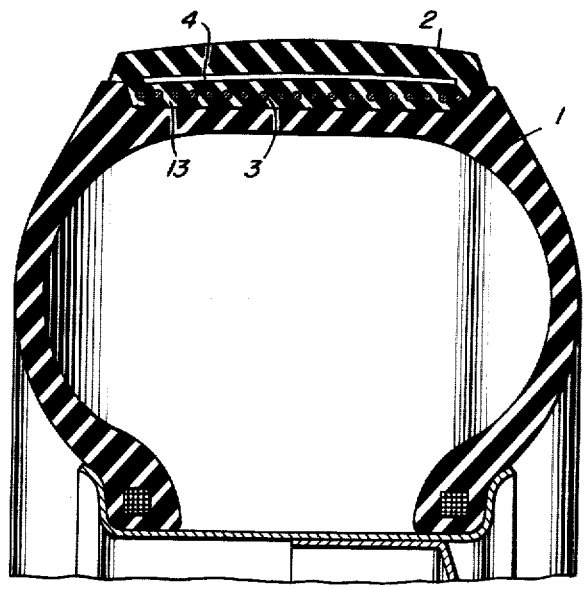
FIGURE 2 is a sectional view, on an enlarged scale, taken along section line 2—2 of FIGURE 1.

Referring to the drawings in detail, FIGURES 1 and 2 show a tire assembly comprising two carcasses 1 and 1' whose mid-circumferential planes are coplanar. A continuous tread 2 passes around the two carcasses in the form of a track and engages each carcass for an arc of about 180°. As is shown in the top portion of FIGURE 2, the carcass 1 (as would also be the case with the carcass 1') has a groove 13 in which the tread 2 is encased. The shape of the groove 13 shown in FIGURE 2 is preferred because it aids the tread which passes from the free space between the two carcasses to engage properly with the carcass towards which the tread is moving. In any event, it is necessary that the inner surface of the tread, in the zone intended to engage the carcasses, should have a shape which is complementary to that of the groove 13.

As can be seen further from FIGURE 2, the tread is provided with a resistant structure 3 shown, by way of example, as a single layer. This layer constituting the resistant structure 3 may be formed by a cord wound in the form of a helix whose coils are disposed substantially in the longitudinal direction. A layer 4 of transversal cords is located within the tread 2 over the layer 3; in other words, the layer 4 of transversely cords is located substantailly radially outwardly with respect to the resistant layer 3.

The carcasses shown in FIGURES 1 and 2, as well as those later to be described in connection with FIGURES 3 to 5, can be any of several different types.

Figure 3:
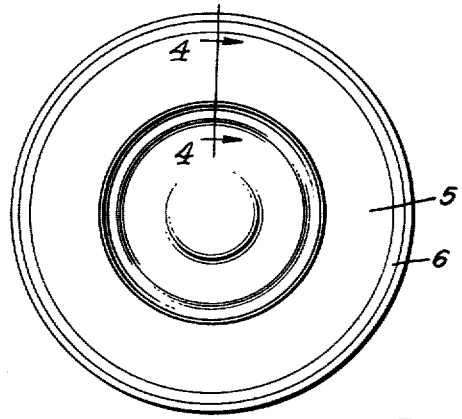
FIGURE 3 is a semi-diagrammatic view representing another embodiment of the present invention.
Figure 4:
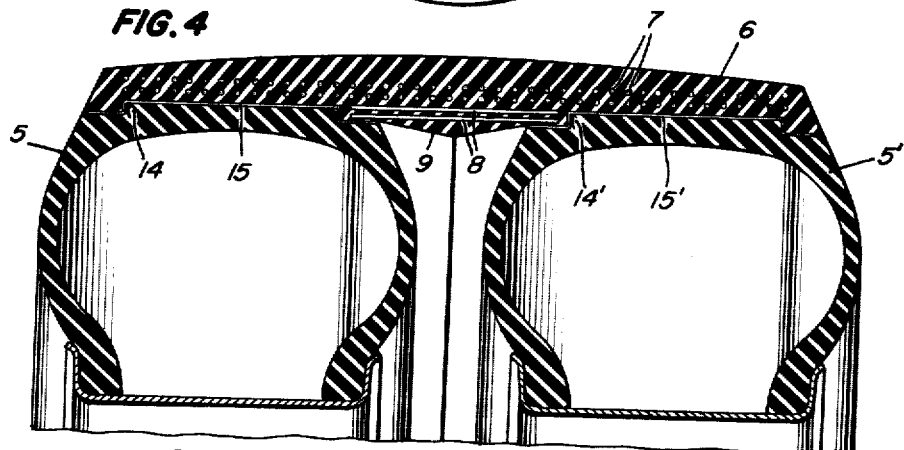
FIGURE 4 is a sectional view, on an enlarged scale, taken along section line 4—4 of FIGURE 3.

FIGURES 3 and 4 show another embodiment of the present invention illustrating the so-called "twin-assembly." Two carcasses 5 and 5', comprising carcasses of the type referred to above, are disposed with their axes of rotation coaxial. The carcasses 5 and 5' are provided with wide projecting zones 14 and 14' which are received in suitable cavities 15 and 15' respectively, on the inner surface of the tread 6. The tread 6 is provided with a resistant structure 7 comprising two layers of cords (shown diagrammatically) inclined at a small angle with respect to the mid-circumferential planes of the two carcasses, the cords of one layer forming, with respect to each mid-circumferential plane, an angle equal and symmetrical to that formed by the cords of the other layer. The resistant structure extends transversely for the entire width of the tread and longitudinally around the entire length of the tread.

FIGURE 4 also shows the transversal reinforcement 8 which supports the central portion 9 of the tread not coming into contact with the carcasses 5 and 5'. This reinforcement 8 comprises two layers of transversal cords embedded in the projection 9, the latter constituting the central shoulder between the two cavities 15 and 15'.

The cords of the reinforcement 8, instead of being normal to the mid-circumferential planes of the tires, can be disposed in such a way as to form relatively large angles, preferably not smaller than 70°, with respect to said mid-circumferential planes; in this case, the cords of one or more layers are inclined, with respect to said mid-circumferential planes, at angles equal and opposite to those formed by the cords of the other layers. The reinforcement 8 can be constituted by rods of metal or of a relatively stiff plastic material preferably disposed transversally to the tread.

Figure 5:
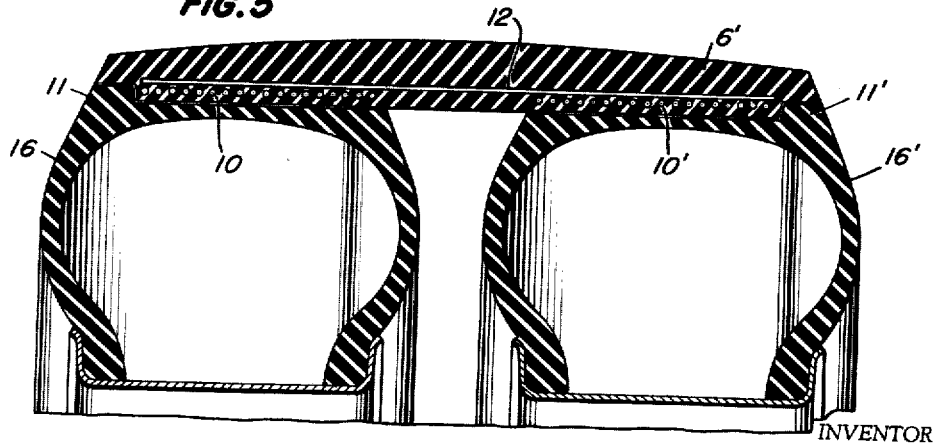
FIGURE 5 is a sectional view similar to FIGURE 4 showing a further embodiment of the present invention.
Figure 6:
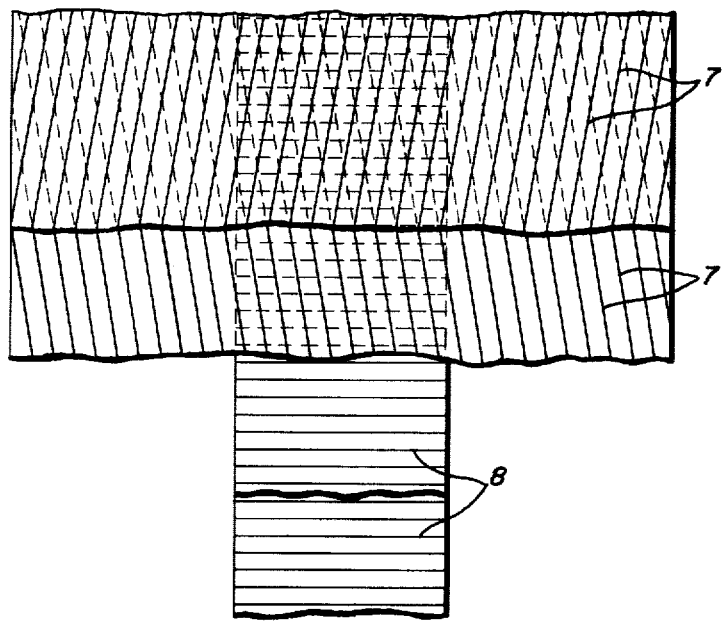
FIGURE 6 is a fragmentary and diagrammatic plan view of the embodiment of the invention shown in FIGURE 4, developed in plane.
Figure 7:
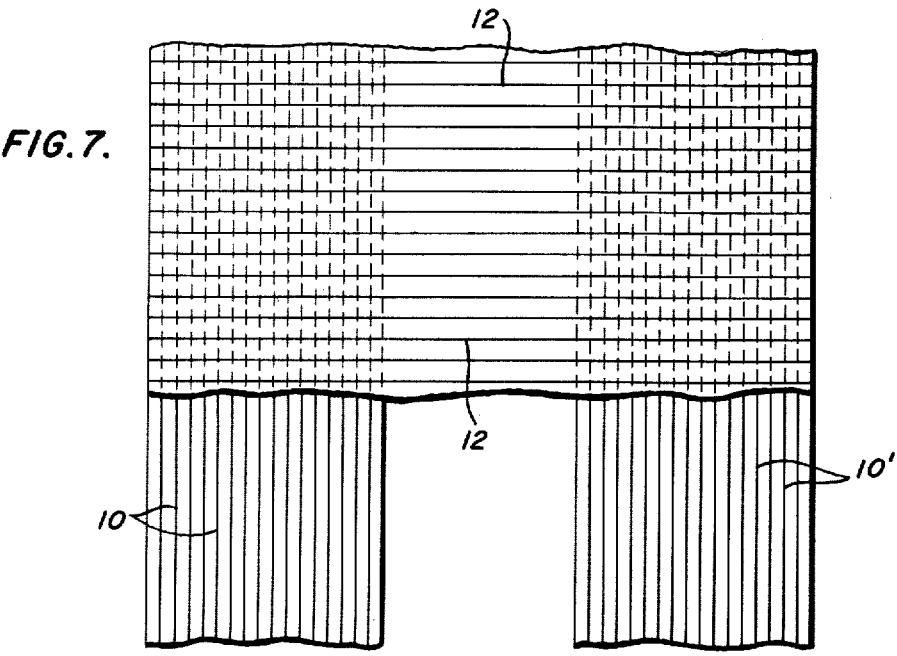
FIGURE 7 is a view like FIGURE 6, but of the embodiment of the invention shown in FIGURE 5.

FIGURE 5 shows another embodiment of the present invention representing a modification of the structure shown in FIGURE 4. In this figure, the tread 6' is provided with a resistant structure subdivided into two parts 10 and 10' disposed in the tread zones which engage the two carcasses 16 and 16', respectively. Each resistant structure, 10 or 10', is composed of a single layer made from a cord wound in the form of a helix whose coils are disposed substantially in the longitudinal direction. Over the two parts of the resistant structure, there is disposed a layer 12 of transversal cords extending for the whole width of the tread. Since the form of the invention shown in FIGURE 5 is intended to facilitate the flexibility of the tread in a radial direction in that portion where the tread is not bearing against the carcass, in order to allow the formation of a projecting curb or ridge in the ground, the carcasses preferably are not provided with longitudinal projections at their inner edges, but are smooth as illustrated in FIGURE 5. At their outer edges, the carcasses 16 and 6' are provided with two longitudinal projections 11 and 11', respectively.

Whereas, the present invention has been described in particular relation to the accompanying drawings, it should be understood that other and further modifications, apart from those shown or suggested herein, may be made within the spirit and scope of this invention.

What is claimed is:

1. A tire assembly for vehicles comprising a group of at least two inflatable carrying carcasses, a single removable tread directly engaging and interconnecting each of said carcasses, said carcasses being of the type permitting minute longitudinal movements of the tread relative to said carcasses, said tread embodying an internal resistant structure rendering the tread longitudinally inextensible, the inner peripheral surface of said tread being of a shape in its zones engaging said carcasses complementary to the outer peripheral surface of said carcasses, and said internal resistant structure being under tension upon inner inflation of said carcasses.

2. A tire assembly as set forth in claim 1 wherein said group of carcasses comprises at least two carcasses in longitudinal alignment such that their mid-circumferential planes are coplanar.

3. A tire assembly as set forth in claim 1 wherein said group of carcasses comprises at least two carcasses in transverse alignment whereby their axes of rotation are coaxial.

4. A tire assembly as set forth in claim 1 wherein the resistant structure of the tread extends for substantially the entire width of the tread.

5. A tire assembly as set forth in claim 1 wherein the resistant structure of the tread is limited to those zones wherein the tread comes into contact with the carcasses.

6. A tire assembly as set forth in claim 2 wherein said tread is provided with at least one layer of cords disposed substantially transversally and located radially outwardly with respect to the resistant structure of the tread.

7. A tire assembly as set forth in claim 2 wherein the tread is provided, in the zones which do not directly engage the carcasses, with an additional reinforcement formed by substantially transverse elements.

8. A tire assembly as set forth in claim 7 wherein said additional reinforcement is disposed below the resistant structure of the tread.

References Cited in the file of this patent

UNITED STATES PATENTS

| | | |
|---|---|---|
| 2,127,075 | Venosta | Aug. 16, 1938 |
| 2,365,279 | Kraft | Dec. 19, 1944 |
| 2,898,965 | Eddy | Aug. 11, 1959 |
| 2,985,214 | Lugli | May 23, 1961 |
| 2,998,998 | Hyler et al. | Sept. 5, 1961 |

FOREIGN PATENTS

| | | |
|---|---|---|
| 464,323 | France | Jan. 10, 1914 |

UNITED STATES PATENT OFFICE
CERTIFICATE OF CORRECTION

Patent No. 3,105,536                      October 1, 1963

Giulio Cappa

It is hereby certified that error appears in the above numbered patent requiring correction and that the said Letters Patent should read as corrected below.

Column 2, line 34, for "tthe" read -- the --; column 4, line 19, for "transversely" read -- transversal --; column 5, line 3, for "6'" read -- 16' --.

Signed and sealed this 21st day of April 1964.

(SEAL)
Attest:

ERNEST W. SWIDER
Attesting Officer

EDWARD J. BRENNER

Commissioner of Patents